July 1, 1958  F. HERMAN ET AL  2,840,907
CREAM CHEESE HOLDER AND SPREADER
Filed April 8, 1957  2 Sheets-Sheet 2

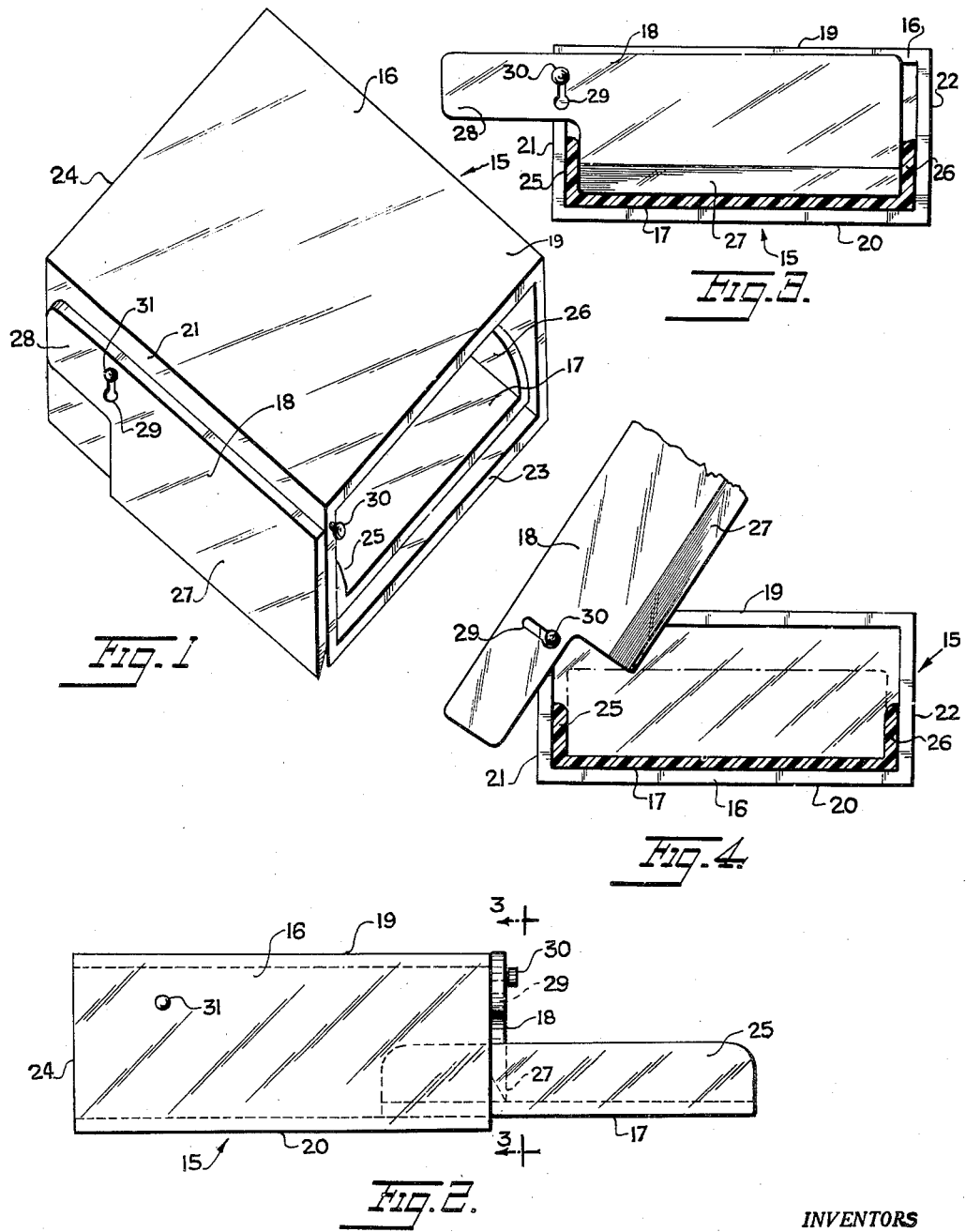

INVENTORS
FRIEDA HERMAN
BY MARIO ROSSI
ATTORNEY

United States Patent Office 2,840,907
Patented July 1, 1958

2,840,907

CREAM CHEESE HOLDER AND SPREADER

Frieda Herman, Flushing, and Mario Rossi, Brooklyn, N. Y.

Application April 8, 1957, Serial No. 651,524

3 Claims. (Cl. 31—20)

This invention relates to new and useful improvements in food containers and dispensers for holding and serving brick cream cheese and the like.

More particularly, the present invention proposes the construction of an improved container for holding and serving cream cheese and the like which can be used for attractive packaging of such for transporting, displaying and stocking or selling and also used by the consumer for convenient serving and storage.

As a further object, the present invention proposes forming the structure with an outer cover of transparent plastic or other like material slidably and removably housing a tray and removably holding a cutter-spreader for the contents of the package for serving purposes.

Still further, the present invention proposes constructing the structure with means on the cover pivotally and slidably to mount the cutter-spreader in guillotine fashion for cutting cream cheese or the like on the tray and removably to mount the cutter-spreader for serving the cut portions and spreading.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a container, holder and server constructed and arranged in accordance with the present invention.

Fig. 2 is a side view of the structure shown in Fig. 1 with the tray partly pulled out and the cutter-spreader in place and lowered.

Fig. 3 is a sectional view taken on line 3—3 of Fig. 2.

Fig. 4 is a view similar to Fig. 3 but with the cutter-spreader raised and partly broken away.

Figure 5:
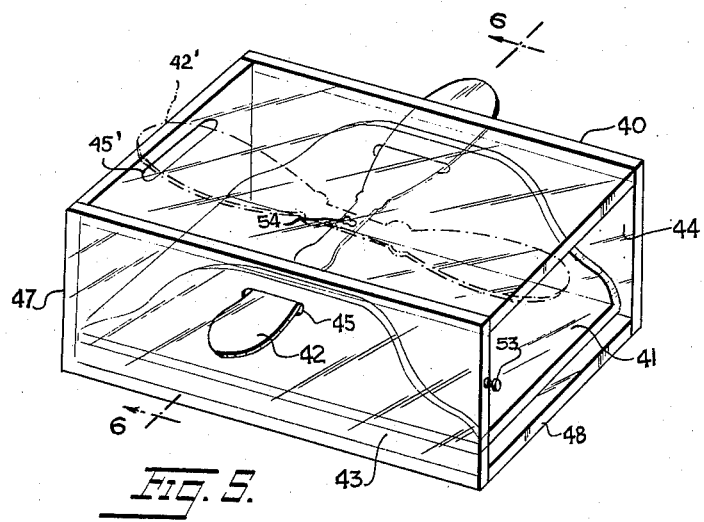
Fig. 5 is a view similar to Fig. 1 but illustrating a modification of the invention.

Referring more particularly to the drawings, the container, holder and server, in accordance with the first form of the invention shown in Figs. 1 to 4, inclusive, is designated generally by the reference numeral 15.

The container, holder and server 15 has a tubular outer cover 16, a tray 17 and a cutter-spreader 18, all constructed of clear plastic or other like material.

Outer cover 16 is box-shaped with top 19, bottom 20, sides 21 and 22 and open ends 23 and 24. The tray 17 slidably and removably fits in the cover 16.

Tray 17 has sides 25 and 26 and open ends. It is adapted to hold brick cream cheese or the like either wrapped or unwrapped.

Cutter-spreader 18 has a blade 27 of shorter span than the tray 17 so as slidably to fit between the tray sides 25 and 26 when crosswise of the tray. Cutter-spreader 18 also has a handle 28 with an inverted keyhole-shaped pivot pin opening 29.

A headed pivot pin 30 is fixed to the outer cover 16 adjacent one upper corner of the open end 23 of the cover. The head of the pivot pin 30 fits through the large portion of the pivot pin opening 29 in the cutter-spreader 18 and the shank of the pivot pin 30 fits through the small portion of opening 29 pivotably and slidably to mount the cutter-spreader on the cover 16.

Also provided on the outer cover 16, on its side 21, is a retainer pin 31 which frictionally and removably fits the pivot pin opening 29 of the cutter-spreader 18 removably to mount the cutter-spreader on the cover when not in use.

Operation of the structure is simple. The cutter-spreader is removed from its inoperative position of Fig. 1 and mounted on the pivot pin of the cover. The tray is pulled out to position its contents under the cutter-spreader which is operated in guillotine fashion to cut the cheese or the like on the tray. The cutter-spreader is then raised and removed for use as a spreader and server.

Figure 6:
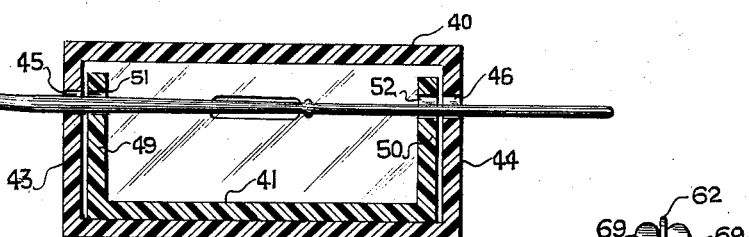
Fig. 6 is a sectional view taken on line 6—6 of Fig. 5.

The modification of the invention illustrated in Figs. 5 and 6 is characterized by the provision of an outer cover 40, a tray 41 and a cutter-spreader 42. The other cover 40 has opposed sides 43 and 44 with cutter-spreader openings 45 and 46 and open ends 47 and 48. Tray 41 has opposed sides 49 and 50 which preferably are foldable flat or upright or upstanding. Sides 49 and 50 have cutter-spreader openings 51 and 52 adapted to align with the cover openings 45 and 46 when the tray is in the cover. The cutter-spreader 42 is adapted to extend through the aligned openings 45, 51, 46 and 52 to lock the tray in the cover.

The cutter-spreader 42 may also be held in a longitudinal position by inserting one end 42' thereof in the end opening 45', for ready use.

A headed pivot pin 53 is fixed to the outer cover at open end 48. A keyhole-shaped pivot pin opening 54 is provided midway the ends of the cutter-spreader 42. The large portion of the opening 54 fits over the head of the pivot pin 53 and the shank of the pivot pin slidably fits in the small portion of opening 54. In this manner, the cutter-spreader 42 may be slidably and pivotally mounted on the outer cover at will, and the blade portion of the cutter-spreader is adapted to be swung into the tray in a cutting action.

Figure 8:
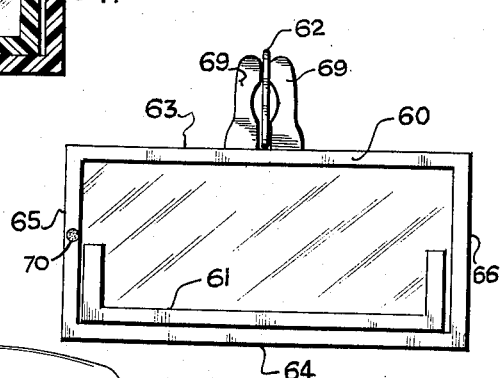
Fig. 8 is an end view of the structure shown in Fig. 7.
Figure 7:
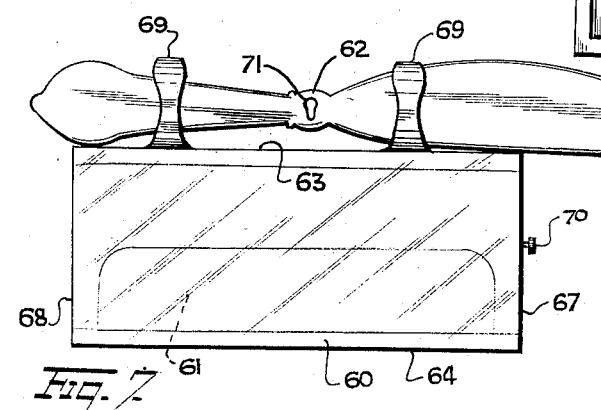
Fig. 7 is a view similar to Fig. 2 but illustrating another modification of the invention.

The modification of the invention illustrated in Figs. 7 and 8 is characterized by the provision of an outer cover 60, a tray 61 and a cutter-spreader 62. The outer cover 60 has a top 63, bottom 64, sides 65 and 66 and open ends 67 and 68. On the top are spaced brackets or spring clips 69 removably to secure and hold the cutter-spreader 62 on the outer cover.

A headed pivot pin 70 is fixed to the outer cover 60 at one of the open ends and a pivot pin opening 71, keyhole-shaped, is provided midway the ends of the cutter-spreader 62 slidably, pivotally and removably to mount the cutter-spreader in cutting position on the outer cover 60.

It is to be understood that the corners and the edges of the container may be rounded or curved, also that the upper cover of the container may be arranged with a suitable hinge for the purpose of opening and closing the same.

While we have illustrated and described the preferred embodiments of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. A container, holder and server for cream cheese and the like comprising a tubular outer cover, a tray adapted to hold brick-shaped cream cheese and the like slidably and removably contained in said cover, and a cutter-spreader removably connected to the cover to cut and spread the contents of the tray, said cover having an open end for entrance and exit of the tray and means to mount the cutter-spreader pivotally on the cover at said open end as a guillotine guided by abutment with the cover, said means being a pivot pin on the cover adjacent one upper corner of said open end of the cover, said cutter-spreader having a blade of shorter span than the tray and a handle with an inverted keyhole-shaped pivot pin opening to permit partial rotation of the cutter-spreader when the cutter-spreader is raised and to guide the cutter-spreader blade into the tray when the cutter-spreader is lowered.

2. A container, holder and server for cream cheese and the like comprising a tubular outer cover, a tray adapted to hold brick-shaped cream cheese and the like slidably and removably contained in said cover, and a cutter-spreader removably connected to the cover to cut and spread the contents of the tray, said cover having an open end for entrance and exit of the tray and means to mount the cutter-spreader pivotally on the cover at said open end as a guillotine guided by abutment with the cover, said means being a pivot pin on the cover adjacent one upper corner of said open end of the cover, said cutter-spreader having a blade of shorter span than the tray and a handle with an inverted keyhole-shaped pivot pin opening to permit partial rotation of the cutter-spreader when the cutter-spreader is raised and to guide the cutter-spreader blade into the tray when the cutter-spreader is lowered, said tray having opposed upright sides and said cutter-spreader blade being adapted slidably to fit between said sides.

3. A container, holder and server for cream cheese and the like comprising a tubular outer cover, a tray adapted to hold brick-shaped cream cheese and the like slidably and removably contained in said cover, and a cutter-spreader removably connected to the cover to cut and spread the contents of the tray, said cover having an open end for entrance and exit of the tray and means to mount the cutter-spreader pivotally on the cover at said open end as a guillotine guided by abutment with the cover, said means being a pivot pin on the cover adjacent one upper corner of said open end of the cover, said cutter-spreader having a blade of shorter span than the tray and a handle with an inverted keyhole-shaped pivot pin opening to permit partial rotation of the cutter-spreader when the cutter-spreader is raised and to guide the cutter-spreader blade into the tray when the cutter-spreader is lowered, said tray having opposed upright sides and said cutter-spreader blade being adapted slidably to fit between said sides, and a retainer pin on the outer cover adapted to fit frictionally into the pivot pin opening of the cutter-spreader removably to hold the cutter-spreader to the cover.

References Cited in the file of this patent

UNITED STATES PATENTS 1,123,623     Terry _____ Jan. 5, 1915